United States Patent [19]

Ferrigno

[11] 3,853,574

[45] Dec. 10, 1974

[54] PROCESSING MODIFIED PIGMENTARY COMPOSITIONS

[76] Inventor: Thomas Howard Ferrigno, 29 Clover Hill Cir., Trenton, N.J. 08638

[22] Filed: July 5, 1973

[21] Appl. No.: 376,461

Related U.S. Application Data

[63] Continuation-in-part of Ser. No. 306,926, Nov. 15, 1972.

[52] U.S. Cl. .......... 106/288 B, 106/306, 106/308 B
[51] Int. Cl. .............................................. C09c 1/28
[58] Field of Search ............ 106/288 B, 308 B, 309, 106/306

[56] References Cited
UNITED STATES PATENTS 3,533,821   10/1970   Landquist ........................ 106/306

*Primary Examiner*—Delbert E. Gantz
*Assistant Examiner*—J. V. Howard
*Attorney, Agent, or Firm*—Sperry and Zoda

[57] ABSTRACT

Anhydrous silicate minerals are employed in combination with hydrous silicate minerals to produce pigmentary compositions by admixture of said minerals in a pulverized form with an inorganic binder followed by the formation of agglomerates which are calcined to produce pigmentary compositions embodying numerous particles of the minerals bonded together and presenting internal voids and multiple light reflecting surfaces. The compositions thus produced posess light reflecting properties greatly exceeding those of the minerals from which they are formed. Morever, the pigmentary compositions are characterized by specific gravities substantially below that of the material of which they are formed whereas the water absorption characteristics of the pigmentary compositions are relatively low, permitting their use in liquid or plastic media without adversely affecting the viscosity thereof beyond that attainable with other pigments.

13 Claims, No Drawings

PROCESSING MODIFIED PIGMENTARY COMPOSITIONS

This application is a continuation-in-part of copending application Ser. No. 306,926 filed Nov. 15, 1972.

FIELD OF INVENTION

As disclosed in said copending application for patent, novel pigmentary compositions may be produced by forming pulverized anhydrous silicate minerals into aggregated bodies of agglomerates with an inorganic binder after which the agglomerated minerals are calcined to produce products having internal voids but possessing limited porosity and presenting a multitude of light reflecting surfaces. Such products accordingly have an opacity greatly exceeding that of the minerals of which they are composed together with reduced specific gravity and limited water absorption characteristics.

It has now been discovered that pigmentary compositions having the same or even greater opacity can be produced when using a mixture of anhydrous and hydrous silicate minerals. Moreover, the operations employed in producing the pigmentary compositions can be modified and simplified in some respects. Furthermore, the finished pigmentary compositions generally have improved physical properties and strength which extends their uses particularly when employed in mastic compositions, plastics or in liquid media under conditions wherein they may be subjected to intense working or shearing action which might tend to break the pigmentary compositions.

The present invention also renders it possible to employ a wider variety of minerals and mixtures thereof many of which require but little preparation for use and are quite inexpensive and readily available in large quantity.

PREFERRED EMBODIMENTS

In accordance with the present invention it is still desirable to use anhydrous silicate minerals in producing the pigmentary compositions and in fact at least half or more of the minerals incorporated in the compositions should be anhydrous silicates. As disclosed in said copending application the preferred anhydrous silicate used is feldspar although it is possible to use many other anhydrous silicate minerals such as silica; alkali metal silicates such as berylium, magnesium and calcium silicates; alumino silicates; alkali alumino silicates such as lithium, berylium, barium, sodium, magnesium, calcium and potassium alumino silicates and mixtures thereof.

Such anhydrous silicates generally have specific gravities varying from about 2.2 to 2.8. They are employed in a comminuted form which may vary in average particle size from about 2 to 100 microns but preferably have an average particle size of from about 2 to 20 microns.

The hydrous silicate minerals which are employed may be of widely varying classes and types. For example phyllosilicates consisting of two or three layer silicates such as kaolinite, serpentine, pyrophyllite, talc, mica and chlorite as well as non-swelling montmorillonites may be used. Sorosilicates such as hemimorphite, hydrous zinc silicate, lawsonite and the epidote group of sorosilicates which contain calcium and aluminum ions can be employed. Among the tectosilicates which are useful are opal or hydrous silica and the zeolite group. The amphibole group of inosilicates such as tremolite and actinolite may be used as well as perlite which includes siliceous volcanic glasses derived from alkali feldspar and silica and containing 2 to 6 percent of water.

The hydrous silicates ordinarily have a specific gravity in the range of 2 to 3 and are generally smaller than the particles of anhydrous mineral and may range in average particle size from about 0.5 to 100 microns. The preferred size is from about 1.5 to 20 microns equivalent spherical diameter.

The refractive indices of the various silicate minerals employed in the practice of the present invention all range from about 1.43 to 1.75. When such minerals are dispersed in organic media having a similar refractive index, such as tricresyl phosphate for example, they contribute little or no opacity thereto in tests wherein the dispersion is placed in a glass beaker and a white sheet having printing thereon is viewed therethrough. However, mixtures of minerals having even slightly different refractive indices contribute to the opacity of the pigmentary compositions when used in combination in accordance with the present invention.

Although it is generally preferable to use minerals having no distinct color due to iron, manganese, etc., many colors become less pronounced or even disappear on calcining. Added reducing agents or reducing atmospheres in the calcining step also aid in producing acceptable white products. Of course, if it is the intention to produce a colored pigmentary composition as described in copending application Ser. No. 356,055 the choice of the mineral and its color will be governed by the final color of the product desired.

In any event and in accordance with the present invention the opacity of the pigmentary compositions produced is substantially greater than that of the individual minerals contained therein with the result that the refractive indices and opacities of the various minerals is of less importance than the combined effects attained by temporarily bonding the mineral particles together to form agglomerates and then calcining to form permanent bonds in the pigmentary compositions characterized by the presence of internal voids and multiple light reflecting surfaces.

The inorganic binder used to temporarily bond the agglomerates prior to consolidation in the calcining step may be chosen from three different classes. Thus, expanding lattice montmorillonites are preferred but a glassy phosphate such as the sodium polyphosphates having from 4 to 100 phosphorus atoms per molecule and described in U.S. Pat. No. 3,127,238 may be used and various soluble silicates such as the alkali metal silicates of commerce including sodium, lithium and potassium silicates may be employed.

In some compositions embodying the present invention opacifying agents may be used as modifiers to impart desired colors thereto as described in copending application Ser. No. 356,055.

The proportions of the ingredients used in producing products in accordance with the present invention may be varied considerably but for most purposes they are employed in the following general and preferred ranges.

| Compositions | | | | |
|---|---|---|---|---|
| Basic: | General | | Preferred | |
| | Max. | Min. | Max. | Min. |
| Anhydrous Silicate Mineral | 89 | 49.5 | 78 | 54 |
| Hydrous Silicate Mineral | 49.5 | 10 | 40 | 20 |
| Binder, inorganic | 10 | 1 | 6 | 2 |
| Colored: | | | | |
| Anhydrous Silicate Mineral | 89 | 40 | 78 | 49 |
| Hydrous Silicate Mineral | 40 | 10 | 40 | 20 |
| Inorganic Colorant | 10 | tr | 5 | tr |
| Inorganic Binder | 10 | 1 | 6 | 2 |
| White Opacity Modified: | | | | |
| Anhydrous Silicate Mineral | 88 | 40 | 73 | 54 |
| Hydrous Silicate Mineral | 30 | 10 | 30 | 20 |
| Opacity Modifying Agent | 20 | 1 | 10 | 5 |
| Inorganic Binder | 10 | 1 | 6 | 2 |

If desired, small amounts of dispersing agents and other additives may be used in formulating the compositions. In producing the agglomerates to be calcined, the particulate anhydrous and hydrous silicate minerals may be intimately mixed together along with any opacifying agent or colorant which may be used. The binder may be then added to the mixture in the form of a solution or dispersion with sufficient water to assure uniform distribution of the binder and adequate plasticity. The resulting product may be then formed into beads, pellets, spheriods or any suitable shape containing numerous particles of the silicate minerals adhering together. Alternately, agglomerate formation may be accomplished by spraying a solution or dispersion of the binder into the dry mixture as it is fed to the pan of a rotating disc pelletizer or into a tumbling drum, or by spray drying a fluid mixture of the particles and binder. The mixture in a plastic form may be passed through extruders or other forming or compacting equipment followed by a sizing or pressing operation to produce suitably sized and shaped agglomerates each containing numerous particles of the minerals.

The agglomerated product thus produced is then dried by any suitable means until the free water content thereof is reduced to from about 0 to 10 percent by weight. The removal of water from the agglomerates serves to bond the mineral particles together to permit the agglomerates to be handled and calcined. It is also found in practice that when the hydrous silicate minerals in the mixture are of somewhat smaller average size than the particles of anhydrous mineral therein, the mixture is more plastic and workable when forming the agglomerates due to the better packing of the particles together. Moreover, the amount of the inorganic binder required in producing the agglomerates may be reduced. The density and strength of the resulting agglomerates is accordingly increased so that they have less tendency to crumble or fall apart during the subsequent operations of drying and calcining.

The dried agglomerates are thereafter calcined at a temperature near the melting point of the minerals contained therein, say, at a temperature of from about 1,100° to 1,200°C for about 5 to 15 minutes for feldspar. The temperature employed and the duration of the calcining operation may be varied considerably but should be controlled to assure effective bonding and incipient fusion of the mineral particles at their points of contact without actual melting thereof. In this way strong pigmentary compositions, which will not crumble or be destroyed upon subsequent handling or working, are obtained.

The pigmentary compositions thus produced contain numerous intermingled particles of anhydrous and hydrous silicate minerals, with or without the presence of an opacifying agent, permanently bonded together. The compositions may have an average size of from about 20 microns to 1 centimeter depending upon the manner in which they are formed and the use for which they are intended. For use in thin films such as paints, for example, the pigmentary compositions may have an average size of about 20 to 50 microns. When used in thicker sections such as plastics, castings, caulks and the like, the pigmentary compositions may have sizes of from about 100 to 1000 microns, whereas in very thick sections may be as large as 1 centimeter in their greatest dimension.

Because of the presence of internal voids or cavities the specific gravity of the pigmentary composition is substantially less than that of the minerals of which it is composed; the reduction in specific gravity varying from about 5 to 40 percent. On the other hand, the pigmentary compositions exhibit minor surface porosity as demonstrated by the fact that the water absorption capacity thereof ranges from 0 to 10 percent or less. In some instances, and for some purposes, products having a much higher water absorption, up to 20 percent or more, may be produced but for most purposes a water absorption of from 0 to 5 or 6 percent is desirable.

At the same time the strength of the agglomerated pigmentary products is sufficient to enable them to withstand vigorous working in paint dispersers, plastic working or masticating equipment without adverse rupture or attritional effects.

The presence of relatively fine particles of hydrous silicate minerals in combination with somewhat larger particles of anhydrous silicates embodied in the individual pigmentary compositions serves to increase the number of light reflecting facets and surfaces therein whereby the visible light reflectance of the pigments greatly exceeds those of the minerals contained therein. As a result, when they are dispersed in a liquid medium having a refractive index approximating the refractive indices of the silicate minerals contained, such as tricresyl phosphate, the pigments exhibit a high opacity and, in the event colorants are incorporated therein, they also have distinctive and brilliant colors.

In order to illustrate typical embodiments of the present invention the following examples are cited:

| EXAMPLE | MINERAL | %Subst. | Min./C | Specific Gravity | | | %water abs. |
|---|---|---|---|---|---|---|---|
| | | | | Determined | Calculated | %reduction | |
| No. 1 | Feldspar | 0 | 10/1100 | 2.37 | 2.63 | 9.9 | 2.2 |
| | | | 10/1130 | 2.26 | | 14.1 | 0 |
| No. 2 | Al-Sil-Ate LO | 40 | 10/1100 | 2.31 | 2.61 | 11.5 | 3.3 |
| | | 10 | 10/1130 | 2.31 | 2.63 | 12.2 | 1.5 |

| EXAMPLE | MINERAL | %Subst. | Min./C | Specific Gravity Determined | Specific Gravity Calculated | %reduction | %water abs. |
|---|---|---|---|---|---|---|---|
| No. 3 | Asbestine 3X | 40 | 10/1130 | 2.36 | 2.69 | 12.3 | 0 |
|  |  | 10 | do. | 2.37 | 2.65 | 10.6 | 0 |
| No. 4 | Mica | 40 | 10/1100 | 2.22 | 2.70 | 17.8 | 1.0 |
|  |  | 10 | 11/1130 | 2.43 | 2.65 | 8.3 | 1.0 |
| No. 5 | Snow Floss | 40 | 10/1130 | 2.12 | 2.39 | 7.1 | 4.0 |
|  |  | 10 | 11/1130 | 2.32 | 2.57 | 9.7 | 1.7 |
| No. 6 | Perlite | 40 | 10/1100 | 2.11 | 2.53 | 16.6 | 20.5 |
|  |  | 20 | 10/1130 | 2.22 | 2.58 | 14.0 | 3.4 |
|  |  | 10 | do. | 2.33 | 2.61 | 10.7 | 3.2 |
| No. 7 | Pyrocron | 40 | do. | 2.20 | 2.66 | 17.3 | 5.8 |
|  |  | 10 | do. | 2.44 | 2.64 | 7.6 | 0.5 |
| No. 8 | Sheroid | 40 | do. | 2.22 | 2.68 | 17.2 | 2.5 |
|  |  | 10 | do. | 2.38 | 2.65 | 10.2 | 1.3 |

In each of the examples cited, the anhydrous silicate material employed was a feldspar in the form of a froth-flotation product consisting of a natural mixture of ablite, orthoclase and anorthite with the particles thereof ranging in size from 2 to 100 microns and an average particle size of 11 microns.

Example No. 1 is cited as a "control" and corresponds to the products disclosed in copending application Ser. No. 306,926. In this case 96 parts by weight of the feldspar were mixed with 4 parts by weight of an inorganic binder consisting of "Bentonite L", which is a product of Georgia Kaolin Co., adjusted to 5 percent $Na_2O$ content. The agglomerates produced were hand formed discs or discs pressed in a die to yield ovate cross-section discs of about 0.4 by 0.05 cm. which were thereafter dried and calcined at the temperatures and for the times indicated above.

In Examples 2 to 8 the same anhydrous silicate mineral was used but a part thereof was replaced by the indicated amounts of the hydrous silicate mineral cited. The inorganic binder again being 4 parts by weight of "Bentonite L".

The "Al-Sil-Ate LO" of Example 2 is a product of Freeport Kaolin Co. and is a water-fractionated kaolinite of the phyllosilicates having an average particle size of 3.5 microns, an average refractive index of 1.56 and a density of 2.58.

The Asbestine 3X of Example 3 is a product of International Talc Co. consisting principally of tremolite of the amphibole group of the inosilicates with accessory minerals chlorite, serpentine and antigorite of the phyllosilicates. The product has an average particle size of 10 microns, and average refractive index of about 1.62 and a specific gravity of 2.78. Its color is white.

The mica used in Example 4 was dry ground mica schist, 100 percent passing a 200 mesh U.S. Standard sieve — or 74 microns — and had a specific gravity of 2.78 and a refractive index of 1.6. Its color was gray.

The "Snow Floss" of Example 5 is a product of Johns-Manville Corp. and is a diatomite representative of opal. It has a predominance of particles in the range of 1 to 4 microns, a specific gravity of 2.10, an average refractive index of 1.43 and is of a buff to pink color.

The perlite of Example 6 is a crude product of Johns-Manville Corp. having a specific gravity of 2.4 and an average particle size of about 100 microns analyzing 2.8 percent loss at 1000°C, 73.0 $SiO_2$, 13.3 percent $Al_2O_3$, 4.04 percent $Na_2O$ and 4.81 percent $K_2O$ with other lesser oxides.

The Pyrocron of Example 7 is a product of Pfizer Inc. and is basically pyrophyllite with minor amounts of muscovite (mica) having a specific gravity of 2.71, an average particle size of 11 microns and an average refractive index of 1.59. It has a pink color.

The Sheroid used in Example 8 is a product of Pfizer Inc. and is a chlorite and muscovite mixed mineral called sheridanite. It has a specific gravity of 2.75, a refractive index of about 1.6 and an average particle size of 10 microns. It has a buff color.

It will be noted from the results obtained in the examples cited above that the reduction in the specific gravity and the water absorption characteristics of the pigments vary considerably depending upon the calcining conditions. Thus in Example 6 the water absorption was reduced from above 20 percent to below 4 percent upon an increase in the calcining temperature of only 30°C. The relatively large size of the particles of perlite used in Example 6 as compared with the particles of feldspar therein also contributed to the resulting high water absorption of the product. Pigments having a water absorption above 10 percent may be used as thickening agents or absorbents.

Ordinarily, there is a greater reduction in the specific gravity of the product with an increase in the proportion of the hydrous silicate to the anhydrous silicate in the product. Furthermore, depending on the calcining conditions a range of specific gravity reduction and water absorption characteristics may be attained. Accordingly, it is possible to vary and control the properties of the pigmentary compositions to obtain products having a reduction in specific gravity of from 5 to 40 percent and a water absorption from 0 up to 10 percent.

All of the products obtained in accordance with the foregoing examples exhibited considerably increased opacity as compared with those of the silicate minerals of which they are composed. The color of the products varied from brilliant white in Example 3 to gold in Example 4 and pink in Examples 7 and 8. On the other hand, the color of the compositions can be controlled and varied as desired by the addition of opacifying agents, colorants or the like as described in copending application Ser. No. 356,055. Thus, as indicated above in the table of General and Preferred compositions of the products, up to 20 percent of the composition may consist of opacifiers or colorants and other modifiers. When colored opacifying agents or modifiers are employed, substantially any suitable inorganic colorant may be used. Such white opacifiers as titanium dioxide, zirconium oxide, zirconium silicate, zirconium double silicates, zinc oxide, antimony oxide and tin oxide are representatives whereas color producing agents such as iron oxide, manganese oxide, lead chromate, ultramarine, and ceramic colorants of various and complex composition may be used. It is therefore possible to produce pigmentary compositions in accordance with the present invention having a whole spectrum of colors, shades and tints as desired.

It will therefore be apparent that the color, composition and properties of products embodying the present invention are capable of wide variation. In view thereof it should be understood that the particular examples disclosed and described above are intended to be illustrative only and are not intended to limit the scope of the invention.

I claim:

1. A pigmentary composition comprising calcined agglomerates consisting essentially of the following in parts by weight

| | |
|---|---|
| Anhydrous Silicate Mineral | from 40 to 89 |
| Hydrous Silicate Mineral | from 10 to 50 |
| Inorganic Binder | from 1 to 10 | said inorganic binder being selected from the group consisting of sodium polyphosphates, expanding lattice montmorillonite and soluble silicates of sodium, potassium and lithium, said anhydrous silicate minerals being in the form of particles having an average size in the range of from 2 to 20 microns and said hydrous silicate minerals being in the form of particles having an average size in the range of from 1.5 to 20 microns, said agglomerates ranging in size from about 20 microns to one centimeter and having a specific gravity at least 5 percent below that of the minerals contained therein.

2. A pigmentary composition as defined in claim 1, wherein the constituents thereof are present in the following proportions in parts by weight

| | |
|---|---|
| Anhydrous Silicate Mineral | from 54 to 78 |
| Hydrous Silicate Mineral | from 20 to 40 |
| Inorganic Binder | from 2 to 6 |

3. A calcined pigmentary composition as defined in claim 1 having a water absorption not exceeding 10 percent by weight.

4. A calcined pigmentary composition as defined in claim 1 wherein said hydrous silicate mineral is selected from the group consisting of phyllosilicates, sorosilicates, tectosilicates, the amphibole group of inosilicates, perlite and the non-swelling montmorillonites, and mixtures thereof.

5. A calcined pigmentary composition as defined in claim 1 wherein said anhydrous silicate mineral is selected from the group consisting of silica; the silicates of berylium, magnesium, and calcium; and the alumino silicates of lithium, berylium, barium, sodium, potassium; and mixtures thereof.

6. A calcined pigmentary composition as defined in claim 1 wherein the average particle size of the anhydrous silicate mineral is from about 2 to 20 microns.

7. A calcined pigmentary composition as defined in claim 1 wherein the anhydrous silicate mineral is feldspar.

8. A calcined pigmentary composition as defined in claim 1 wherein said inorganic binder is an alkali silicate.

9. A calcined pigmentary composition as defined in claim 1 wherein said inorganic binder is an expanding lattice montmorillonite.

10. A calcined pigmentary composition as defined in claim 1 wherein said inorganic binder is a glassy phosphate containing from 4 to 100 phosphorous atoms per molecule.

11. A calcined pigmentary composition as defined in claim 1 wherein an opacifying agent is present in the composition in an amount up to 20 percent by weight of the product.

12. A calcined pigmentary composition as defined in claim 11 in which said opacifying agent is an inorganic colorant present in amounts up to 10 percent by weight.

13. A calcined pigmentary composition as defined in claim 1 wherein said anhydrous silicate is feldspar, said hydrous silicate is tremolite and said inorganic binder is an expanding lattice montmorillonite.

* * * * *

UNITED STATES PATENT OFFICE
CERTIFICATE OF CORRECTION

Patent No. 3,853,574　　　　　　　　Dated December 10, 1974

Inventor(s) Thomas Howard Ferrigno

It is certified that error appears in the above-identified patent and that said Letters Patent are hereby corrected as shown below:

Column 8, Line 38, change "is" to -- comprises --.

Signed and Sealed this twenty-seventh Day of January 1976

[SEAL]

Attest:

RUTH C. MASON
*Attesting Officer*

C. MARSHALL DANN
*Commissioner of Patents and Trademarks*